United States Patent
Calverley et al.

(10) Patent No.: US 6,395,841 B1
(45) Date of Patent: May 28, 2002

(54) PROCESS FOR HYDROGENATING UNSATURATED POLYMERS

(75) Inventors: Edward M. Calverley; Avani Patel; Dennis A. Hucul; Jonathan H. Siddall, all of Midland, MI (US)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/717,866

(22) Filed: Nov. 21, 2000

Related U.S. Application Data

(60) Provisional application No. 60/230,394, filed on Sep. 6, 2000.

(51) Int. Cl.⁷ .................................................. C08F 8/04
(52) U.S. Cl. ................. 525/338; 525/332.8; 525/332.9; 525/333.1; 525/333.2; 525/339
(58) Field of Search ................................. 525/338, 339

(56) References Cited

U.S. PATENT DOCUMENTS

| | | | | |
|---|---|---|---|---|
| 4,629,767 A | * | 12/1986 | Shyr et al. ................ | 525/333.7 |
| 4,656,230 A | * | 4/1987 | Shyr et al. ................ | 525/332.2 |
| 5,378,767 A | * | 1/1995 | Massie ........................ | 502/327 |
| 5,612,422 A | | 3/1997 | Hucul et al. | |
| 6,310,112 B1 | * | 10/2001 | Vo et al. ...................... | 521/134 |

FOREIGN PATENT DOCUMENTS

WO  WO 99/64479  9/1998

* cited by examiner

*Primary Examiner*—Bernard Lipman

(57) ABSTRACT

The present invention is a continuous process for hydrogenating an unsaturated polymer comprising: contacting the unsaturated polymer with a hydrogenating agent in a fixed bed reactor, wherein the reactor is packed with a hydrogenation catalyst characterized in that the hydrogenation catalyst comprises a Group VIII metal component and at least one deactivation resistant component.

14 Claims, No Drawings

PROCESS FOR HYDROGENATING UNSATURATED POLYMERS

CROSS REFERENCE STATEMENT

This application claims the benefit of U.S. Provisional Application No. 60/230,394, filed Sep. 6, 2000.

The present invention relates to a continuous hydrogenation process for hydrogenating unsaturated polymers.

BACKGROUND OF THE INVENTION

Unsaturated polymers have been previously hydrogenated using a variety of catalysts and conditions. Historically, typical hydrogenation catalysts have low reactivity and require high catalyst to polymer ratios, especially in hydrogenation of aromatic polymers. Improvements in catalytic hydrogenation have been achieved using various metals and supports. Group VIII metals on porous supports have been particularly useful in hydrogenating unsaturated polymers, especially aromatic polymers such as described in U.S. Pat. No. 5,612,422. However, these catalysts have been found to have a relatively short life span in that they deactivate upon contact with polar impurities, which are common to aromatic polymer feed streams. Additionally, previous hydrogenation processes have typically been performed as batch processes. However, batch processes are economically inefficient and product consistency is more difficult to attain.

WO99/64479 by Asahi discloses a method of hydrogenating vinyl aromatic-conjugated diene block copolymers using a fixed-bed reactor packed with a hydrogenation catalyst comprising a platinum group metal deposited on an inorganic support. However, the catalyst used provides low hydrogenation rates, requiring long reaction times.

Accordingly, it remains highly desirable to provide a continuous process of hydrogenating unsaturated polymers at high hydrogenation rates using a catalyst which is resistant to deactivation.

SUMMARY OF THE INVENTION

The present invention is a continuous process for hydrogenating an unsaturated polymer comprising:
  contacting the unsaturated polymer with a hydrogenating agent in a fixed bed reactor, wherein the reactor is packed with a hydrogenation catalyst characterized in that the hydrogenation catalyst comprises a Group VIII metal component and at least one deactivation resistant component.

Surprisingly, the combination of the above hydrogenation catalyst and a fixed bed reactor provides an improved and very efficient continuous hydrogenation process, wherein the hydrogenation rate is high, steady stable performance is achieved, and the catalyst packing is resistant to deactivation upon exposure to impurities within the polymer; thus allowing for greater productivity during the useful life of the catalyst.

DETAILED DESCRIPTION OF THE INVENTION

The continuous process of the present invention hydrogenates aromatic polymers using a unique catalyst.

The process of the present invention is a continuous one, wherein a composition comprising an unsaturated polymer is continuously fed into a fixed bed reactor, wherein the unsaturated polymer is hydrogenated and continuously removed from the reactor. The fixed bed reactor is packed with a hydrogenation catalyst, herein after referred to as mixed hydrogenation catalyst, characterized in that it comprises an admixture of at least two components. The first component comprises any metal which will increase the rate of hydrogenation and includes nickel, cobalt, rhodium, ruthenium, palladium, platinum, other Group VIII metals, or combinations thereof. Preferably rhodium and/or platinum is used. However, platinum is known to be a poor hydrogenation catalyst for nitrites, therefore, platinum would not be preferred in the hydrogenation of nitrile copolymers. The second component used in the mixed hydrogenation catalyst comprises a promoter which inhibits deactivation of the Group VIII metal(s) upon exposure to polar materials, and is herein referred to as the deactivation resistant component. Such components preferably comprise rhenium, molybdenum, tungsten, tantalum or niobium or mixtures thereof.

The amount of the deactivation resistant component is at least an amount which significantly inhibits the deactivation of the Group VIII metal component when exposed to polar impurities within a polymer composition, herein referred to as a deactivation inhibiting amount. Deactivation of the Group VIII metal is evidenced by a significant decrease in hydrogenation reaction rate. This is exemplified in comparisons of a mixed or two component hydrogenation catalyst and a catalyst containing only a Group VIII metal component under identical conditions in the presence of a polar impurity, wherein the catalyst containing only a Group VIII metal component exhibits a hydrogenation reaction rate which is less than 75 percent of the rate achieved with the mixed hydrogenation catalyst.

Preferably, the amount of deactivation resistant component is such that the ratio of the Group VIII metal component to the deactivation resistant component is from 0.5:1 to 10:1, more preferably from 1:1 to 7:1, and most preferably from 1:1 to 5:1.

The catalyst can consist of the two components alone, but preferably the catalyst additionally comprises a support on which the components are deposited. The support can be any material which will allow good distribution of the components and produce an efficient catalyst which can be used in the continuous process of the present invention. Typically, the support will be a porous material produced from a material such as a silica, alumina, magnesium oxide or carbon, having a narrow pore size distribution.

The pore size distribution, pore volume, and average pore diameter of the support can be obtained via mercury porosimetry following the procedures of ASTM D-4284-83.

The pore size distribution is typically measured using mercury porosimetry. However, this method is only sufficient for measuring pores of greater than 60 angstroms. Therefore, an additional method must be used to measure pores less than 60 angstroms. One such method is nitrogen desorption according to ASTM D-4641-87 for pore diameters of less than about 600 angstroms. Therefore, narrow pore size distribution is defined as the requirement that at least 98 percent of the pore volume is defined by pores having pore diameters greater than 600 angstroms and that the pore volume measured by nitrogen desorption for pores less than 600 angstroms, be less than 2 percent of the total pore volume measured by mercury porosimetry. It has been surprisingly discovered that the use of supports having large pore diameters and narrow pore size distribution as described, are particularly advantageous in the process of the present invention.

The surface area can be measured according to ASTM D-3663-84. The surface area is typically from 10, preferably from 15 and most preferably from 50 to 100, preferably to 90 and most preferably to 85 m²/g.

In one embodiment, at least 98 percent of the pore volume is defined by pores having pore diameters greater than 300 angstroms and that the pore volume measured by nitrogen desorption for pores less than 300 angstroms, be less than 2 percent of the total pore volume measured by mercury porosimetry. In another embodiment, 98 percent of the pore volume is defined by pores having pore diameters greater than 200 angstroms and the pore volume for pores less than 200 angstroms is less than 2 percent of the total pore volume measured by mercury porosimetry.

The desired average pore diameter is dependent upon the polymer which is to be hydrogenated and its number average molecular weight (Mn). It is preferable to use supports having higher average pore diameters for the hydrogenation of polymers having higher molecular weights to obtain the desired amount of hydrogenation. For high molecular weight polymers (Mn$\Delta$200,000 for example), the typical desired surface area can vary from 15 to 25 m²/g and the desired average pore diameter from 3,000 to 4000 angstroms. For lower molecular weight polymers (Mn<200,000 for example), the typical desired surface area can vary from 45 to 85 m²/g and the desired average pore diameter from 200 to 700 angstroms.

The shape of the support is not particularly limited and can include spherical or cylindrical particles. Extrusion-molded supports with side cuts or ring-shaped supports can also be used. The size of the catalyst, in the case of spherical particles, can be 0.2 to 10 mm in diameter; in the case of cylindrical particles, their diameters can be in the range of 0.2 to 10 mm and their lengths in the range of 0.2 to 20 mm.

Methods of preparing such supports are well known by those skilled in the art. Silica supports are preferred and can be made by combining potassium silicate in water with a gelation agent, such as formamide, polymerizing and leaching as exemplified in U.S. Pat. No. 4,112,032. The silica is then hydrothermally calcined as in Iler, R. K., *The Chemistry of Silica*, John Wiley and Sons, 1979, pp. 539–544, which generally consists of heating the silica while passing a gas saturated with water over the silica for about 2 hours or more, at temperatures from about 600° C. to about 850° C. Hydrothermal calcining results in a narrowing of the pore diameter distribution as well as increasing the average pore diameter. Alternatively, the support can be prepared by processes disclosed in Iler, R. K., *The Chemistry of Silica*, John Wiley and Sons, 1979, pp. 510–581.

Methods of preparing supported catalysts are also well known by those skilled in the art. For example, a silica supported catalyst can be made using the process described in U.S. Pat. No. 5,110,779, which is incorporated herein by reference. An appropriate metal, metal component, metal containing compound or mixtures thereof, can be deposited on the support by vapor phase deposition, aqueous or nonaqueous impregnation followed by calcination, sublimation or any other conventional method, such as those exemplified in *Studies in Surface Science and Catalysis* "Successful Design of Catalysts" V. 44, pg. 146–158, 1989 and *Applied Heterogeneous Catalysis pgs.* 75–123, Institute Francais du Petrole Publications, 1987. For catalysts employed in a fixed bed reactor, it may be advantageous to deposit the active metal component and the deactivation resistant component preferentially near the outer surface of the catalyst support. For example, catalysts with such a controlled distribution of metals may be obtained by limiting the amount of solvent used during the metals application.

Any other suitable means of obtaining this non-uniform distribution would also be acceptable. In methods of impregnation, the appropriate metal containing compound can be any compound containing a metal, as previously described, which will produce a usable hydrogenation catalyst which is resistant to deactivation. These compounds can be salts, coordination complexes, organometallic compounds or covalent complexes.

Typically, the total metal content of the supported catalyst is from 0.1 to 10 wt. percent based on the total weight of the supported catalyst. Preferable amounts are from 0.2 to 8 wt. percent, more preferably 0.5 to 5 wt. percent based on total catalyst weight.

Promoters, such as alkali, alkali earth or lanthanide containing compounds, can also be used to aid in the dispersion of the metal component onto the support or stabilization during the reaction, though their use is not preferred.

Polymers which can be hydrogenated by the process of the present invention, include any unsaturated polymer containing olefinic or aromatic unsaturation. Such polymers include hydrocarbon polymers produced from olefinic monomers, such as homopolymers of butadiene or isoprene, copolymers thereof, and aromatic polymers and copolymers. Aromatic polymers which can be hydrogenated by the process of the present invention include any polymeric material containing pendant aromatic functionality. Pendant aromatic functionality refers to a structure wherein the aromatic group is a substituent on the polymer backbone and not embedded therein. Preferred aromatic groups are C6–20 aryl groups, especially phenyl. These aromatic polymers may also contain other olefinic groups in addition to aromatic groups. Preferably, the aromatic polymer is derived from a monomer of the formula:

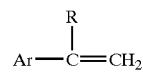

wherein R is hydrogen or alkyl, Ar is phenyl, halophenyl, alkylphenyl, alkylhalophenyl, naphthyl, pyridinyl, or anthracenyl, wherein any alkyl group contains 1 to 6 carbon atoms which may be mono- or multisubstituted with functional groups such as halo, nitro, amino, cyano, carbonyl and carboxyl. More preferably Ar is phenyl or alkylphenyl with phenyl being most preferred. Homopolymers may have any stereostructure including syndiotactic, isotactic or atactic; however, atactic polymers are preferred. In addition, copolymers containing these aromatic monomers including random, pseudo random, block, tapered block, star and grafted copolymers may also be hydrogenated. For example, copolymers of vinyl aromatic monomers and comonomers selected from nitrites, acrylates, acids, ethylene, propylene, maleic anhydride, maleimides, vinyl acetate, and vinyl chloride may also be used, such as styrene-acrylonitrile, styrene-alpha-methylstyrene and styrene-ethylene. Block copolymers of vinyl aromatic monomers may also be used, such as styrene-alpha-methylstyrene block copolymers, styrene-butadiene or styrene-isoprene block copolymers and various multi-block copolymers thereof. Examples include styrene-butadiene, styrene-isoprene, styrene-butadiene-styrene and styrene-isoprene-styrene block copolymers. Further examples of block copolymers may be found in U.S. Pat. Nos. 4,845,173, 4,096,203, 4,200,718, 4,201,729, 4,205,016, 3,652,516, 3,734,973, 3,390,207, 3,231,635, and 3,030,346. Blends of polymers including impact modified, grafted rubber containing aromatic polymers may also be used.

Preferably the number average molecular weight (Mn) of the polymer to be hydrogenated is from 10,000 to 3,000,000, more preferably from 30,000 to 400,000, and most preferably from 50,000 to 300,000, as measured by gel permeation chromatography.

The composition comprising the unsaturated polymer, hereinafter referred to as polymer feed, typically contains small amounts of contaminants which deactivate typical Group VIII metal hydrogenation catalysts. Such contaminants include polymeriztion terminators and polar materials, and polymerization catalyst remnants such as lithium. The process of the present invention allows for more efficient hydrogenation and longer catalyst life, even when hydrogenating polymer feeds containing such contaminants.

The continuous process of the present invention utilizes a fixed bed reactor wherein the catalyst is packed into the reactor and the polymer feed flows through the fixed catalyst bed. Any fixed bed reactor may be used, without any particular limitations. Multi-tube type reactors may be used to efficiently remove heat. The liquid and gas effluents from the fixed bed may be separated and recycled to the bed again in order to make more efficient use of the hydrogen or to help control the temperature of the reactor.

The fixed catalyst bed is typically operated at a temperature of 40 to 250° C., preferably 50 to 200° C. and especially preferably at 50 to 180° C. The reactor can be operated adiabatically, that is, allowing the heat of reaction to be absorbed by the reacting mixture, or it may be operated using any process for heat addition and removal known in the art, including shell and tube reactors, multi-stage reactors with inter-stage heating or cooling, cold shot addition reactors and the like.

The reaction is typically performed at a hydrogen pressure of 0.5 to 15 MPa, preferably 1 to 20 MPa, and most preferably from 2 to 15 MPa, a hydrogen gas flow rate/polymer solution flow rate ratio of 20 to 700 normal liters per liter (Nl/l), preferably from 20 to 500 Nl/l and most preferably from 40 to 350 Nl/l, and a liquid hourly space velocity (LHSV) of 0.01 to 15 (l/hr), preferably 0.03 to 10 (l/hr) and most preferably from 0.05 to 10 (l/hr). LHSV is defined as the liquid feed rate in liters per hour divided by the catalyst bed volume in liters.

The hydrogenation reaction effluent which has reached the target hydrogenation can be separated into the hydrogen gas, solvent, and hydrogenated polymer by any method, including devolatilization and other separation techniques.

The hydrogenation reaction is preferably conducted in a hydrocarbon solvent in which the polymer is soluble and which will not hinder the hydrogenation reaction. Preferably the solvent is a saturated solvent such as cyclopentane, cyclohexane, cycloheptane, cyclooctane, methylcyclohexane, decalin, ethylcyclohexane, dodecane, dioxane, diethylene glycol dimethyl ether, tetrahydrofuran, isopentane, decahydronaphthalene and the like or mixtures thereof, with cyclohexane being the most preferred. Mixtures of n-hexane, n-heptane and other hydrocarbons can also be used as well as mixtures with ethers, tetrahydrofuran, dioxane, diethylene glycol dimethyl ether, alcohols, ethers or amines.

The polymer concentration will typically be from 5 to 30 weight percent, preferably from 5 to 25 weight percent.

The hydrogenation reaction is typically conducted in the absence of oxygen. Typically, the reaction vessel is purged with an inert gas to remove oxygen from the reaction area prior to start up. Inert gases include but are not limited to nitrogen, helium, and argon, with nitrogen being preferred.

The hydrogenating agent can be any hydrogen producing compound which will hydrogenate the unsaturated polymer. Hydrogenating agents include but are not limited to hydrogen gas, hydrazine and sodium borohydride. In a preferred embodiment, the hydrogenating agent is hydrogen gas.

Examples of fixed bed hydrogenations for low molecular weight polymers are included in U.S. Pat. No. 3,809,687 which is incorporated herein by reference.

In one embodiment, the fixed bed reactor comprises a vertical reaction column packed with a granular hydrogenation catalyst. A composition comprising a block copolymer is continuously passed through the column while contacted with a hydrogenating agent. The direction of flow of the polymer solution and the hydrogen gas may be opposite or the same, but the parallel flow method is preferable. The direction of this flow may be upward or downward.

The amount of hydrogenation is dependent upon the polymer being hydrogenated, the catalyst used, the process conditions and the reaction time. For olefinic polymers, at least 80 percent of the olefinic bonds are hydrogenated to give a hydrogenation level of 80 percent, preferably at least 90 percent, more preferably at least 95 percent and most preferably 100 percent. For polymers such as polystyrene and styrene-butadiene copolymers, a typical aromatic hydrogenation is greater than 80% (wherein greater than 80% of the aromatic bonds are hydrogenated), preferably greater than 99%, and more preferably greater than 99.5%. This can be determined by measuring the UV absorbance of the hydrogenated polymer and comparing to the absorbance of a non-hydrogenated standard. In other words, the absorbance of a 99.5% hydrogenated polymer will be 99.5% less than the absorbance of the non-hydrogenated polymer. For polymers such as poly alpha-methylstyrene, styrene-alpha-methylstyrene copolymer and copolymers of a vinyl aromatic monomer and a comonomer selected from the group consisting of a nitrile, acrylate, acid, ethylene, propylene, maleic anhydride, maleimide, vinyl acetate and vinyl chloride, the level of hydrogenation can be lower, and is dependent upon the polymer being hydrogenated. Typically, at least 20% aromatic hydrogenation is achieved, preferably at least 30%, more preferably at least 50% and most preferably at least 90% aromatic hydrogenation is achieved.

The amount of olefinic hydrogenation can be determined using Infrared spectroscopy or proton NMR techniques. The amount of aromatic hydrogenation can be measured using UV-VIS spectroscopy. Cyclohexane solutions of polystyrene give a very distinct absorption band for the aromatic ring at about 260.5 nm. This band gives an absorbance of 1.000 with a solution concentration of 0.004980 moles of aromatic per liter in a 1 cm cell. The absorbance is dependent upon concentration. The hydrogenated polymer products are typically measured at higher concentrations since they are not diluted before the absorbance is measured. Since the reaction solution is about 15–30 times more concentrated than the standards, small amounts of residual unsaturation can be accurately measured.

In one embodiment, the process of the present invention comprises contacting a polymer feed composition comprising at least one unsaturated polymer and at least one polar impurity, with a hydrogenation agent in the presence of a supported mixed hydrogenation catalyst, characterized in that the supported mixed hydrogenation catalyst comprises at least one Group VIII metal component and at least a deactivation inhibiting amount of at least one deactivation resistant component selected from the group consisting of a rhenium, molybdenum, tungsten, tantalum and niobium component.

The following examples are set forth to illustrate the present invention and should not be construed to limit its scope. In the examples, all parts and percentages are by weight unless otherwise indicated.

The amount of aromatic hydrogenation is measured using UV-VIS spectroscopy as described previously. The amount of olefinic hydrogenation is determined using Infrared spectroscopy.

Mn is an absolute molecular weight measured by gel permeation chromatography, unless otherwise specified.

All polymer samples used in the examples have atactic stereostructure.

EXAMPLES

Example 1

A) Preparing the Silica Support 150 g of potassium silicate (Kasil #1, a product of PQ Corp.) and 10 g of water is charged to a 250 milliliter (ml) beaker and stirred while 15 grams(g) of formamide is added slowly such that no precipitation occurs. The mixture is continuously stirred for about 5 minutes until a clear homogeneous solution is obtained. The mixture is then placed in an 80° C. oven for 5 hours and the silica polymerized. The silica is removed, broken into pieces of less than 8 mesh, and washed with 500 ml of 1 M acetic acid, 500 ml of 1 M ammonium acetate and finally with 500 ml of 80° C. 1 M ammonium acetate. The washed silica is placed in a 1.0 inch O.D. quartz tube and a flow of air at room temperature is started over the silica. The silica then undergoes a hydrothermal calcination. The following procedure is used, the silica is heated from 25° C. to 850° C. at a rate of 3.5° .C/min. Upon reaching 150° C., the air is passed through a bubbler to saturate with water while the heating continues. At 850° C. the calcination is continued isothermally for 2 hours. The silica is then cooled to 350° C. with water saturated air. Upon reaching 350° C. the saturator is removed and the silica is cooled with dry flowing air to about 80° C. and removed from the quartz tube. The data below shows the pore size distribution via mercury porosimetry.

| | |
|---|---|
| Pore Volume | 1.37 cc/g |
| Total Pore Area | 14.2 m$^2$/g |
| Median Pore Diameter (Volume) | 3845 angstroms |
| Median Pore Diameter (area) | 3672 angstroms |
| Average Pore Diameter (4V/A) | 3817 angstroms |

Three additional batches are prepared using the same procedure described above and are shown in Table I. The surface area of Table I is measured according to ASTM method D-3663-84.

TABLE I

| Sample | Pore Volume (cc/g) | Avg. Pore Diam. (4 V/A) (angstroms) | Surface Area (m$^2$/g) |
|---|---|---|---|
| 1 | 1.4 | 3800 | 14 |
| 2 | 1.6 | 3600 | 17 |
| 3 | 1.5 | 3900 | 15 |

However, mercury porosimetry should not be relied on alone to check pore size distributions because it is not sensitive to pores of less than 60 angstroms. Nitrogen desorption techniques measures pores of less than 600 angstroms. Using this technique, the silica as prepared in Sample I above has a cumulative pore volume in pores of less than 100 angstroms of 0.006 cc/g, a cumulative pore volume in pores of less than 320 angstroms of 0.013 cc/g and a cumulative pore volume in pores of less than 600 angstroms of 0.016 cc/g. Therefore, the cumulative pore volume for pores less than 600 angstroms is about 1.1 percent of the cumulative pore volume for pores greater than 60 angstroms.

Preparation of Pt/Re Catalyst

A solution of 0.411 grams (g) H$_2$PtCl$_6$.6(H2O) and 0.147 g of NH$_4$ReO$_4$ is dissolved in 15.55 grams of purified water. This solution is then added to 5.0 g of silica (1.2 mm×6 mm cylindrical silica) which is then air dried overnight, and further dried at 110° C. in an air purged oven for 30 minutes. The catalyst is reduced in flowing hydrogen at 150° C. for 1 hour to yield a catalyst having 3 weight percent Pt and 2 weight percent Re on SiO$_2$.

Example 1

Hydrogenation of Polystyrene

A vertical jacketed stainless steel tube (70 cm long and 1.57 cm diameter) is loaded with a mixture of 50 grams (100 ML) of 1.2 mm×6 mm cylindrical silica supported catalyst particles (3 wt. % Pt and 2 wt. % Re, with average pore size of 600 Angstroms) and 60 grams (40 mL) of 60–80 mesh glass beads. The reactor is operated at a temperature of 160–185° C. and 93 bar of hydrogen pressure. A polymer solution of 15 parts by weight of polystyrene (Mn 50,000) dissolved in cyclohexane is fed into the top of the reactor at a rate of 5 cc/min for a LHSV of 3.0 cc/(cc h). Hydrogen is fed into the tube at a rate of 752 normal cc/min. The resultant polymer has an aromatic hydrogenation level of 99.8 percent.

Example 2

Hydrogenation of Styrene-butadiene Block Copolymer

Example 1 is repeated with a symmetrical styrene-butadiene pentablock (SBSBS) copolymer having a Mn of 60,000 (85 wt. % styrene) dissolved as a 15 wt. % solution in cyclohexane. The liquid feed rate is 1.5 cc/min and the hydrogen flow is 226 cc/min. The reactor is operated at 170 to 185° C. and 93 bar hydrogen pressure. Shortly after starting the reactor, the conversion of the aromatic portion of the copolymer is measured to be approximately 99.5 percent. After 24 hours at the same conditions, the resultant polymer has an aromatic hydrogenation level of 99.6%.

It has been surprisingly discovered that when the combination of components, as described herein, is used, process productivity is improved, the catalyst is very resistant to deactivation upon contact with impurities and therefore has a longer catalyst lifetime. Typical impurities include any material which slows the hydrogenation reaction rate and leads to incomplete conversion. Impurities typically include polar materials such as aromatic and aliphatic alcohols used to terminate the polymerization reaction, e.g. methanol, isopropanol; ethers such as tetrahydrofuran, esters, and nitrogen containing compounds, such as amines.

What is claimed is:

1. A continuous hydrogenation process comprising
   a) continuously feeding a composition comprising at least one unsaturated polymer into a fixed bed reactor,
   b) contacting the composition with a hydrogenating agent in the presence of a hydrogenation catalyst,
   wherein the catalyst is a mixed hydrogenation catalyst comprising a Group VIII metal component and at least one deactivation resistant component; and the catalyst is packed within the fixed bed reactor, forming a fixed catalyst bed.

2. The process of claim 1 wherein the Group VIII metal comprises platinum or rhodium.

3. The process of claim 1 wherein the Group VIII metal comprises platinum.

4. The process of claim 1 wherein the deactivation resistant component is selected from the group consisting of a rhenium, molybdenum, tungsten, tantalum and niobium component.

5. The process of claim 1 wherein the Group VIII metal comprises platinum and the deactivation resistant component comprises a rhenium, tantalum or molybdenum component.

6. The process of claim 1 wherein the ratio of the Group VIII metal component to the deactivation resistant component is from 1:1 to 10:1.

7. The process of claim 1 wherein the catalyst additionally comprises a support.

8. The process of claim 7 wherein the support is characterized by having at least 98 percent pore volume defined by pores having pore diameters greater than 600 angstroms, as measured using mercury porosimetry, and less than 2 percent pore volume defined by pores having pore diameters of less than 600 angstroms, as measured by nitrogen desorption, based on the total pore volume measured by mercury porosimetry.

9. The process of claim 8, wherein the support is characterized in that at least 98 percent of the pore volume is defined by pores having pore diameters greater than 300 angstroms; and the pore volume measured by nitrogen desorption for pores less than 300 angstroms, is less than 2 percent of the total pore volume measured by mercury porosimetry.

10. The process of claim 9, wherein the support is characterized in that at least 98 percent of the pore volume is defined by pores having pore diameters greater than 200 angstroms; and the pore volume measured by nitrogen desorption for pores less than 200 angstroms, is less than 2 percent of the total pore volume measured by mercury porosimetry.

11. The process of claim 1 wherein the hydrogenating agent is selected from the group consisting of hydrogen gas, hydrazine and sodium borohydride.

12. The process of claim 1 wherein the unsaturated polymer comprises an olefinic homopolymer.

13. The process of claim 1 wherein the unsaturated polymer comprises an aromatic homopolymer or copolymer.

14. The process of claim 13 wherein the unsaturated polymer comprises a block copolymer of a vinyl aromatic polymer and a conjugated diene polymer.

* * * * *